United States Patent [19]
Heimann et al.

[11] Patent Number: 5,938,976
[45] Date of Patent: *Aug. 17, 1999

[54] CORROSION RESISTANT COATINGS CONTAINING AN AMORPHOUS PHASE

[75] Inventors: Robert L. Heimann; William M. Dalton, both of Moberly; Nancy M. McGowan, Sturgeon; David M. Price, Moberly, all of Mo.

[73] Assignee: Elisha Technologies Co. L.L.C., Moberly, Mo.

[ * ] Notice: This patent is subject to a terminal disclaimer.

[21] Appl. No.: 08/791,337

[22] Filed: Jan. 31, 1997

Related U.S. Application Data

[63] Continuation-in-part of application No. 08/634,215, Apr. 18, 1996, abandoned, which is a continuation-in-part of application No. 08/476,271, Jun. 7, 1995, abandoned, which is a continuation-in-part of application No. 08/327,438, Oct. 21, 1994, Pat. No. 5,714,093.

[51] Int. Cl.$^6$ .............................. C09K 3/00; C23F 11/18; C01B 33/20
[52] U.S. Cl. ................................ 252/389.62; 252/389.3; 252/389.61; 106/14.39; 423/326; 423/332; 428/446; 428/450; 428/469; 428/701; 428/702
[58] Field of Search .................................... 428/469, 450, 428/707, 446, 702; 423/326, 332; 252/389.3, 389.62, 389.61; 106/286.7, 286.2, 600, 487, 486, 14.39, 14.44, 635

[56] References Cited

U.S. PATENT DOCUMENTS

| | | | |
|---|---|---|---|
| 3,912,548 | 10/1975 | Faigen | 148/6.15 R |
| 3,917,648 | 11/1975 | McLeod | 26/32.8 SB |
| 4,144,074 | 3/1979 | Itoh et al. | 106/1.17 |
| 4,595,425 | 6/1986 | Harding | 148/18 |
| 4,645,790 | 2/1987 | Frey et al. | . |
| 4,681,749 | 7/1987 | Usui et al. | 423/326 |
| 4,842,645 | 6/1989 | Miyata et al. | . |
| 4,870,814 | 10/1989 | Chacko et al. | 57/217 |
| 5,068,134 | 11/1991 | Cole et al. | . |
| 5,137,706 | 8/1992 | Annen et al. | 423/326 |
| 5,149,439 | 9/1992 | Birchall | 210/702 |
| 5,714,093 | 2/1998 | Heimann et al. | 252/389.62 |
| 5,871,668 | 2/1999 | Heimann et al. | 252/389.62 |

FOREIGN PATENT DOCUMENTS

| | | |
|---|---|---|
| 2655060 | 5/1991 | France . |
| 3618841 A1 | 6/1986 | Germany . |
| 93195233 | 8/1993 | Japan . |
| 93195252 | 8/1993 | Japan . |
| 2099416 | 12/1982 | United Kingdom . |
| PCT/US 95/13441 | 10/1995 | WIPO . |
| WO 96/12770 | 5/1996 | WIPO . |

OTHER PUBLICATIONS

Armstrong, R.D. et al. "Behavior of Sodium Silicate and Sodium Phosphate (Tribasic) as Corrosion Inhibitors for Iron." Journal of Applied Electrochemistry. vol. 24, pp. 1244–1248, 1994.

Armstrong, R.D. et al. "The Corrosion Inhibition of Iron by Silicate Related Materials." Corrosion Science, vol. 28, No. 12, pp. 1171–1181, 1988.

Bailey, E.H. et al. "Catastrophes in Earth History–Extrusive and Intrusive Catastrophes." California Division of Mines and Geology, Bulletin 183, p. 177.

Bernard, M.C. et al. "In situ Raman Study of the Corrosion of Zinc–Coated Steel in the Presence of Chloride," Journal of Electrochemical Society. vol. 142, No. 7, Jul. 1995.

Borovski, B.I. et al. "Protection of Metals from Corrosion in Atmospheric Conditions with Changed Mositure Vlaues.", 6 Lakokras Mater Ikh Primen (1978), pp. 24–26.

Cartledge, G.H. "The Existence of a Flade Potential on Iron Inhibited by Ions of the $XD_{4^{n-}}$ Type." Journal of Electrochemical Society. vol. 114, No. 1, pp. 39–42, 1957.

Cartledge, G.H. "The Mechanism of the Inhibition of Corrosion by the Pertechnetate Ion, Part IV. Comparison with Other $XO_{4^{n-}}$ Inhibitors." J. Electrochem. Soc. vol. 100, pp. 1037–1043, Aug. 1956.

Cartledge, G.H. "Noncathodic Effects of the Permanganate Ion in the Anodic Passivation of Iron." Journal of Electrochemical Society. vol. 114, No. 1, pp. 39–42, 1967.

Cartledge, G.H. "The Passivation of Iron in the Presence of Pertechnetate and Chromate." Journal of Electrochemical Society. vol. 113, No. 4, pp. 328–333, 1968.

"Corrosion in Structures." ASM. vol. 13, p. 1307, Metal Handbook, 9th Ed., 1987.

Hinton, Bruce. "Zirconium Oxide Pretreatment." Metal Finishings. p. 61, Sep. 1991.

"Influence of Atmospheric Variables." pp. 22–23, published in Zinc—Its Corrosion Resistance a Study Commissioned by International Lead Zinc Research Organization, Inc. by C.J. Slunder et, 1971.

Munger, C.G. "The Chemistry of Zinc Silicate Coatings." Corrision Prevention and Control. pp. 140–143, Dec. 1994.

Nagata, Hideki et al. "Analytical Study of the Formation Process of Hemimorphite. Part II. Analysis of the Formation Process from Corrosion Products of Zinc by the Anodic Oxidation Method." Zairyo to Kankyo. vol. 42, pp. 377–383, 1992.

Oprya, V.Y. et al. "The Chemical Stability of Paints with an Enamel XV–794 Base in the Proximity of Poisons.", 4 Lakokras Mater Ikh Primen (1968), pp. 26–28.

Parker, R.L. "Crystal Growth.", Proceedings of the Fifth International Conference on Crystal Growth, Cambridge, Mass. 1977.

(List continued on next page.)

*Primary Examiner*—Shean C. Wu
*Attorney, Agent, or Firm*—Michael K. Boyer

[57] ABSTRACT

The disclosure relates to the forming mineralized coatings on metal surfaces and to methods of forming such coatings. The coating can include a wide range of compounds and normally at least a portion of the coating corresponds to an amorphous phase. The coating and method are particularly useful in providing a corrosion resistant coating or film upon a metallic surface. This aspect of the disclosure involves the formation of a corrosion resistant "mineralized" layer of tailored composition upon a metal substrate.

14 Claims, No Drawings

OTHER PUBLICATIONS

Prokofyeva, M.I. et al. "The Influence of Several Factors in the Production of Zinc Silicate Paints.", 4 Lakokrasoch mater Ikh Primen (1968), pp. 28–29.

Pyor, M.J. et al. "The Inhibition of the Corrosion of Iron by Some Anodic Inhibitors." Journal of Electrochemical Society. vol. 100, No. 3, pp. 203–215, 1953.

Robertson, W.D. "Molybdate and Tungstate as Corrosion Inhibitors and the Mechanism of Inhibition." Journal of Electrochemical Society. vol. 98, No. 3, pp. 94–100. 1951.

Scovil, Jeff. "Crystal Clear." Earth. pp. 58–60, Apr. 1997.

Sergi, G. et al. "Corrosion of Galvanized and Galvannealed Steel in Solutions of pH 9.0 to 14.0." Corrosion. vol. 41(11), pp. 618–624, 1985.

Suziki, Ichiro et al. "Zinc–Zinc Chloride Composite Electrodeposited Steel Sheet." Corrosion Science. vol. 28(5), pp. 475–486, 1987.

Taylor, H.F.W. "The Dehydration of Hemimorphite." The American Mineralogist. vol. 47, pp. 932–945, Jul.–Aug. 1962.

Uhlig, H. "The Flade Potential of Ions Passivated Inorganic Corrosion Inhibitors." Journal of Electrochemical Society. vol. 106, No. 1, pp. 1–7. 1959.

Weisstach, A. et al. "An Electrochemical Study of Heteropoly Molybdates as Cooling Water Corrosion Inhibitors." Corrosion. vol. 28, No. 8, pp. 299–306, 1972.

Williams. L.F.G. "Initiation of Corrosion of Chromated Zinc–Zinc Electroplate on Steel." Corrosion Science. vol. 13, No. 11, pp. 865–868, 1973.

Wroblowa, H.S. et al. "The Mechanism of Oxygen Reduction on Zinc." Journal of Electrochemical Society. vol. 295, pp. 153–161, 1990.

"Ziegler Method." Hawley's condensed Chemical Dictionary, 11th ed., pp. 1249–1257, 1987.

"Zinc Blende."p. 3378, (1992).

Abayarathna, Dharma. "Measurement of Corrosion Under Insulation and Effectiveness of Protective Coatings." NACE 1997.

Abayarathna, Dharma et al. "Monitoring of Corrosion Under Insulation and Effectiveness of Protections Applied." Corrosion '96, NACE T–5A–30a Task Group Meeting. 1996.

Dalton, Bill. "Thin Film Corrosion Coatings for Hardware." NAVSEA 1996. Jun. 6, 1996.

Heimann, Bob. "Solutions for Crevice Corrosion in Wire Rope with Intelligent Material." NAVSEA 1996. Jun. 6, 1996.

McGowan, Nancy. "Effective Technology for Corrosion Under Insulation." Presented at NACE 1997.

McGowan, Nancy. "Innovation and Environmentally Benign Solution for Corrosion Under Insulation (C.U.I.) for Steam Process Piping." NAVSEA 1996. Jun. 6, 1996.

CORROSION RESISTANT COATINGS CONTAINING AN AMORPHOUS PHASE

CROSS-REFERENCE TO RELATED APPLICATIONS

This application is a continuation in part of U.S. patent application Ser. No. 08/634,215 (Attorney Docket No. EL001RH-3) now abandoned, entitled "Corrosion Resistant buffer System for Metal Products" and filed on Apr. 18, 1996 in the names of Robert L. Heimann, et al., which is a continuation in part of U.S. patent application Ser. No. 08/476,271 filed. on Jun. 7, 1995 now abandoned, which in turn is a continuation-in-part of U.S. patent application Ser. No. 08/327,438 filed on Oct. 21, 1994, now U.S. Pat. No. 5,714,093, the disclosure of each of the previously identified patent applications is hereby incorporated by reference.

FIELD OF THE INVENTION

The instant invention relates to the coatings on metal containing surfaces and to methods of forming such coatings on a suitable substrate. The coating can include a wide range of compounds and normally at least a portion of the coating corresponds to an amorphous phase. The inventive coating and method are particularly useful in providing a corrosion resistant coating or film upon a metallic surface. This aspect of the invention involves the formation of a corrosion resistant "mineralized" layer of tailored composition upon a metal containing surfaces.

BACKGROUND OF THE INVENTION

The corrosion of steel and other metal containing products continues to be a serious technical problem which has profound effects on the economy. Corrosion causes loss of natural resources, and deteriorates key infrastructure such as roads and buildings. It also causes premature replacement of equipment and parts in industrial facilities, boats and other marine vehicles, automobiles, aircraft, among a wide range of metallic components.

Current industry standards for corrosion prevention center around the use of barrier coatings, sacrificial coatings, alloys containing heavy metals such as chromium, nickel, lead, cadmium, copper, mercury, barium, among other heavy metals. The introduction of these materials into the environment, however, can lead to serious health consequences as well as substantial costs to contain or separate the materials or clean up environmental contamination. Damage associated with corrosion, accordingly, is a continuing problem and better systems for preventing corrosion are still needed.

A more detailed discussion of mineral containing materials can be found in Manual of Mineralogy, by Dana, $21^{st}$ edition, American Society of Metals, vol. 13, Corrosion in Structures, "Reaction Sequence in Atmospheric Corrosion of Zinc ASTM STP 1239", by W. W. Kirk et al., and Physics and Chemistry of Mineral Surfaces, by Bradly (1996); the disclosure of each of the aforementioned references is hereby incorporated by reference.

Conventional practices for improving protecting metal containing surfaces and imparting improved surface characteristics to metals rely upon compositions and methods which are undesirable as being costly or environmentally unsound.

SUMMARY OF THE INVENTION

The instant invention solves problems associated with conventional practices by providing an improved method and a composition for improving the surface characteristics of a metal containing surface. While the inventive composition is normally compatible with conventional compositions and methods, the inventive composition can obviate the need to employ heavy metals such as chrome and environmentally undesirable solvents.

The present invention in a broad aspect relates to compositions and methods for improving or modifying the surface characteristics of a metal containing surface. In one aspect, the invention involves methods for forming a "mineralized" layer upon the surface of a substrate. One method of forming the mineralized layer comprises delivering precursors of the mineralized layer to the surface of the metal surface via a carrier. The carrier can be a wide range of known compositions such as a film forming composition, lubricants, gel, sealant, adhesive, paint, solvent and water-borne resins, among other conventional compositions for forming coatings or films upon metals. If desired, the carrier can function as a reservoir of precursor materials thereby permitting additional formation of the mineralized layer, e.g., when in the presence of a reservoir a breach in the mineralized layer can be overcome by secondary mineral formation from mineral precursors in the reservoir- a so-called self healing effect. If desired, the carrier can also function as a reservoir of buffer materials, e.g., materials that passivate the pH of the metal surface, which can protect the metal surface by providing an environment in which the metal is resistant to chemical attack. Depending upon the utility of the carrier, the carrier can be removed or remain permanently in contact with the mineralized surface (and at least a portion of the metal surface).

The instant invention provides an improved surface on articles by tailoring the surface chemistry and effecting a new mineralized surface through chemical reaction and interaction. The mineralized surface is formed when precursors are delivered to the surface of a metal or metal coated articles or substrates. In some cases, the carrier includes materials which can function to buffer the surface, as a precursor of the mineralized layer, alter pH, or all of these functions. After providing a proper environment, precursors can interact thereby in situ forming the mineralized layer upon at least a portion of the metal surface. Depending upon the surface environment, the metal or metal coated substrate can contribute donor ions to react and/or interact with delivered precursors thereby forming a relatively thin mineralized layer that is effective in altering and preferably enhance the characteristics of the entire article, e.g., by altering and preferably enhancing the surface characteristics of the article. Consequently, the instant invention permits tailoring a metal containing surface to possess improved corrosion, coating adhesion, chemical resistance, thermal resistance, mechanical abrasion, acid rain resistance, UV resistance, resistance to effects from atomic oxygen and vacuum UV, engineered electrical resistance, among other improved properties. As will be described below in greater detail, at least a portion of the mineralized coating or layer normally corresponds to a novel amorphous phase.

DETAILED DESCRIPTION

The instant invention relates to compositions and methods for forming a mineralized coating or film upon at least a portion of a metal containing surface. By "mineralized" it is meant a composition containing at least one member selected from the group of oxygenated cations and anions wherein at least a portion of the mineral corresponds to an amorphous phase, an inorganic complex oxide crystal and mixtures thereof. Normally, the amorphous phase is the predominate phase component of the mineralized layer and substantially transparent to visible light. By "metal containing surface", "substrate", or "surface" it is meant to refer to a metallic article and any metal containing surface as well as any substrate at least partially coated with a metal layer, film or foil including a non-metallic article having a metal layer. A wide variety of substances can be employed as precursors of the mineralized layer, such as one or more cations of the metals of Groups I, II and III, and the transition metals, of the Periodic Chart of the Elements and one or more of the anions selected from the group consisting of silicates, molybdates, phosphates, zirconates, titanates, tungstates, vandates, permanganate, pertechnetate, chromate, nitrate, carbonates, aluminates, ferrates, mixtures thereof, among others. At least a portion of the resulting mineralized layer having ceramic attributes comprises:

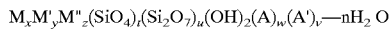

$$M_xM'_yM''_z(SiO_4)_t(Si_2O_7)_u(OH)_2(A)_w(A')_v \cdot nH_2O$$

where M, M', and M'' are ions of Group I, II and/or III metals, and A and A' are alternative anions to $SiO_4$ and where x, y, and z each can be any number including zero but x, y and z cannot all concurrently be zero. Analogously, t, u, v, w and x can each be any number including zero but cannot all concurrently be zero.

The mineralized layer is formed from precursors. By "precursors" it is meant any combination of materials which interact to form the mineralized layer as well as intermediate products that interact further to form the mineralized layer. Examples of precursors include buffers such as silicate buffers and carbonate buffers including sodium hydroxide; silicates such as at least one of sodium, calcium and potassium silicate; silica; cations supplied or delivered to the surface such as at least one of zinc, molybdenium; ions supplied or delivered to the surface such as at least one of oxygen, sulfur or chlorine from the environment surrounding the precursors or surface; compounds which decompose or react to form a precursor or intermediate thereof; mixtures thereof, among others.

The precursors of the mineralized layer are added to any suitable carrier. Examples of suitable carriers include hydrocarbons such as at least one member selected from the group consisting of animal, vegetable, petroleum derived and synthetic oils such as polyalphaolefin (PAO), silicone oil, phosphate esters, fluorinated oils such as KRYTOX (supplied by the DuPont Company). Further examples of suitable carriers comprise at least one member selected from the group consisting of thermoplastic, thermosetting, cross-linked system, mixtures thereof, among others. Specific examples of such carriers include epoxies, acrylics, polyurethanes, silicones, polyesters, alkyds, vinyls, phenolics, fluoropolymers, latexes, mixtures thereof, among others. Depending upon the process conditions, the precursor carrier may be selected from alkylated aromatics, phosphate esters, perfluoroalkylpolyethers, polyesters, olefins, chlorotrifluoroethylene, silahydrocarbons, phosphazenes, dialkylcarbonates, oligomers, polybutenes, and polyphenyl esters, as well as unsaturated polyglycols, silicones, silicate esters, cycloaliphatic hydrocarbons, and dibasic acid esters, e.g., when applying a precursor carrier to an iron containing surface a polyalphaolefin base oil having a kinematic viscosity in the range of about 30–1,400 centistokes at 40° C. can be employed. Other properties to consider when choosing an appropriate polyalphaolefin base oil are molecular weight, molecular branching, thermal stability, and hydrophobicity, depending on the application. The polyalphaolefin base oil can be thickened to a gel with thickeners known to the art of grease manufacturers such as polytetrafluoroethylene or silica. Buffer materials are also suitable as thickeners as long as they are compatible with the base oil. Generally, low molecular weight, synthetic, hydrocarbon oils provide greater ease in designing and manufacturing a gel with particular desired characteristics but are more costly than less refined, high molecular weight, petroleum hydrocarbon oils. Less refined hydrocarbons may also have the disadvantage of containing sulfide compounds which can feed sulfate reducing bacteria and, in turn, tend to corrode metals such as steel, iron and iron alloys.

The carrier film or layer can have a thickness of about 1 to at least about 50 mils, and typically has a thickness of about 1 to about 1.5 mil, e.g., about 0.2 to at least 0.4 mil. Normally, the carrier is semipermeable thereby permitting anions from the surrounding environment to contact precursors to the mineralized product. By "semipermeable" it is meant to refer to a microporous structure, either natural or synthetic allowing passage of ions, water and other solvent molecules, and very small other molecules. The resin can be essentially insoluble in water and resistant to macro-penetration by flowing water. The resin layers, however, are nonnally permeable to water molecules and inorganic ions such as metal ions and silicate ions.

The amount of mineralized layer precursor present in the carrier typically comprises about 1 to about 60 wt. % of the carrier, e.g, normally about 5 to about 10 wt.% depending upon the carrier. The mineralized layer precursors can be combined with the carrier in any suitable conventional manner known in this art.

The mineralized layer precursors can include or be employed along with one or more additives such as the pH buffers such as those listed below in Tables A and B, mixtures thereof, among others. In some cases, a buffer also functions as a precursor, e.g., sodium silicate. The amount of these additives typically ranges from about 1 to about 60 wt. % of the carrier, e.g., normally about 5 to about 10 wt. %. These additives can be added to the carrier in order to tailor the characteristics of the mineralized layer, the carrier itself, upon a pre-treated surface, among other characteristics. By adding suitable mineralized layer precursors, carrier, additives, among other materials, the surface of the metal containing layer can be tailored by forming a mineralized layer to possess improved corrosion resistance, adhesion, among other characteristics.

TABLE A

Examples of Buffering Compounds

| Chemical Name | Formula |
|---|---|
| Boric Acid | $H_3BO_3$ |
| Citric Acid | $H_3C_6H_5O_7 \cdot H_2O$ |
| Sodium Hydroxide | NaOH |
| Trisodium Phosphate Dodecahydrate | $Na_3PO_4 \cdot 12H_2O$ |
| Potassium Silicate | $SiO_2/K_2O$ 1.6–2.5 wt. ratio |
| Sodium Silicate | $SiO_2/Na_2O$ 2.0–3.22 wt. ratio |
| Potassium Hydrogen Phthalate | $KHC_8O_4H_4$ |
| Potassium Dihydrogen Phosphate | $KH_2PO_4$ |
| Borax | $Na_2B_4O_7$ |
| Sodium Hydrogen Carbonate | $NaHCO_3$ |
| Disodium Phosphate Dodecahydrate | $Na_2HPO_4 \cdot 12H_2O$ |
| Sodium Acetate | $NaOOCCH_3$ |
| Disodium Phosphate | $Na_2HPO_4$ |

TABLE B

Examples of Weight Ratios of Buffering Components for Various pH Values

| Desired pH | Weight | Chemical | Weight | Chemical | Weight | Chemical |
|---|---|---|---|---|---|---|
| 3.0 | 1.00 | Boric Acid | 0.84 | Citric Acid | 0.18 | Trisodium Phosphate |
| 3.5 | 1.00 | Boric Acid | 0.84 | Citric Acid | .027 | Trisodium Phosphate |
| 4.0 | 1.00 | Sodium Hydroxide | 196.00 | Potassium Hydrogen | | Phthalate |
| 4.5 | 1.00 | Sodium Hydroxide | 29.30 | Potassium Hydrogen | | Phthalate |
| 5.0 | 1.00 | Sodium Hydroxide | 11.30 | Potassium Hydrogen | | Phthalate |
| 5.5 | 1.00 | Sodium Hydroxide | 6.97 | Potassium Hydrogen | | Phthalate |
| 6.0 | 1.00 | Sodium Hydroxide | 30.40 | Potassium Di-hydrogen | | Phosphate |
| 6.5 | 1.00 | Sodium Hydroxide | 12.20 | Potassium Di-hydrogen | | Phosphate |
| 7.0 | 1.00 | Sodium Hydroxide | 5.84 | Potassium Di-hydrogen | | Phosphate |
| 7.5 | 1.00 | Sodium Hydroxide | 4.14 | Potassium Di-hydrogen | | Phosphate |
| 8.0 | 1.00 | Sodium Hydroxide | 3.64 | Potassium Di-hydrogen | | Phosphate |
| 8.5 | 1.00 | Boric Acid | 0.84 | Citric Acid | 4.80 | Trisodium Phosphate (12 $H_2O$) |
| 9.0 | 1.00 | Boric Acid | 0.84 | Citric Acid | 5.82 | Trisodium Phosphate (12 HO) |
| 9.5 | 1.00 | Sodium Hydroxide | 13.55 | | | Borax |
| 10.0 | 1.00 | Sodium Hydroxide | 6.52 | | | Borax |
| 10.5 | 1.00 | Sodium Hydroxide | 5.25 | | | Borax |
| 11.0 | 1.00 | Sodium Hydroxide | 2.31 | Sodium Hydrogen | | Carbonate |
| 11.5 | 1.00 | Sodium Hydroxide | 8.00 | Disodium | | Acid Phosphate (12$H_2O$) |
| 12.0 | 1.00 | Sodium Hydroxide | 1.30 | Disodium | | Acid Phosphate (12$H_2O$) |
| 12.5 | 1.00 | Sodium Hydroxide | 15.00 | Disodium | | Acid Phosphate |
| 13.0 | 1.00 | Sodium Hydroxide | 1.00 | Sodium | | Acetate |

The aforementioned carrier can be applied to a metal containing surface by using any expedient method. Depending upon the desired results, the metal containing surface can be applied or reapplied as appropriate. Examples of suitable methods for applying the tailored carrier comprise at least one of painting, spraying, dipping, troweling, among other conventional methods.

By employing a suitable tailored carrier, the instant invention can form a mineralized layer to protect a metal containing surface having at least one member from the group of magnesium, aluminum, vanadium, calcium, beryllium, manganese, cobalt, nickel, copper, lead, copper, brass, bronze, zirconium, thallium, chromium, iron, steel, titanium, thallium, zinc, alloys thereof, among others. Particularly, desirable results can be obtained when forming a mineralized layer upon a zinc containing surface.

Without wishing to be bound by any theory or explanation., it is believed that the mineralized layer is formed under a variety of chemical and physical forces including 1) transporting ions through the carrier via osmotic pressure and diffusion thereby providing ions to the metal surface, 2) oxygen deprived environment, 3) buffering to provide a predetermined alkaline pH environment that is effective for formation of the mineralized layer upon a given metal surface, e.g, in the case of a zinc containing surface about 9.5 to at least about 10.5 pH, 4) heterogeneous process using any available ions, 5) water present at the surface, in the carrier or as a reaction product can be removed via heat, vacuum or solvent extraction, 6) using a reservoir adjacent to the metal surface that can control that ion transport rate as well as the rate of water (and moieties) passing through the reservoir and serve to provide, as needed, a continuous supply mineralized layer precursors, among other forces.

The process for forming the inventive mineralized layer can be initiated by delivering buffering ions of combinations or single component alkali metal polyoxylates (for example sodium silicate) to passivate the metal surface, e.g., refer to item 3) in the previous paragraph. In the case of sodium silicate, the carrier contains dissolved silica in the form of a silicate anion in water as well as sodium oxide in the form of sodium hydroxide in the presence of water. If desired, sodium hydroxide can be employed for maintaining the pH of the solution in a range where the silicate can remain soluble. In the case of other substrates and other anion systems, the buffering capacity of the reactants is designed to passivate the surface, manage the pH of the surface chemistry, and to prepare or condition the surface for a mineral-forming reaction. The delivery of ions is through a carrier comprising a membrane employing osmotic pressure to drive precursors to the surface.

The ionic species, which are present in the carrier or that pass through the carrier/membrane, can then interact chemically and can become associated with the surface of the metal to form a submicron mineralization layer, e.g., a monolayer. In the present invention these interactions occur adjacent to or upon the surface of the substrate to form a mineralized layer. It is to be understood that the aforementioned membrane is associated with creating an oxygen-limited passivation environment as part of the mineralization process.

Moreover, the mineralized layer precursors can interact in such a manner to produce mineralized layer in-situ at the surface. Depending upon the conditions of the surface, the substrate may contribute precursors in the form of metal ions. The metal ions of the substrate surface may exist as oxides, or the ions may have reacted with chemical species in the surrounding environment to form other metal species. In the case of a zinc substrate or surface, zinc can oxidize in the environment existing at the surface as zinc oxide, but may also form zinc carbonate from the exposure to carbon dioxide in the air. Under certain conditions, the zinc carbonate will predominate the surface species of the precursor to form the mineralized surface. In the case of other metal substrates, the ability of the surface to contribute ions to function as mineral precursors can be achieved by conditioning the surface, e.g., to populate the surface with oxide species that will participate as mineralized layer precursors. Examples of surface preparation or surface conditioning include employing an anodic or oxidizing agent such as peroxide or sodium bicarbonate, mixtures of agents, among others.

Depending upon the carrier and process condition, precursors can pass through the carrier membrane system as anions, and interact adjacent to or upon the surface with metal cations, which in most cases are donated by the metal surface or substrate to form a relatively thin mineralized layer, e.g., a monolayer. In one aspect of the invention, sodium silicate (as SiO3—ion) reacts with a zinc containing surface, e.g., that exists primarily as zinc carbonate, to form an amorphous mineralization layer containing a nanocrystaline hemimorphite phase that is normally less than 100 Angstroms in thickness. In this aspect of the invention, the metal surface was prepared for mineralization by the presence of a suitable buffering alkali, e.g., buffering with a silicate to a pH in the range of about 9.5 to about 10.5. While a higher pH can be effectively used, a pH of less than about 11 minimizes the need for certain relatively complex and expensive handling procedures.

In another aspect of the invention, the delivery of pH buffering agents as well as the anion reactants can be designed to tailor the surface characteristic. For example, in order to achieve improved resistance to acid rain on a zinc surface, the silicate anions can be complemented with zirconate anions. Further, in the case of an iron containing surface, the carrier can deliver silicate anions to a anodically conditioned surface to form amorphous phase comprising julgoldite.

While any suitable buffer can be employed for practicing the invention, buffer solutions are typically prepared by mixing a weak acid and its salt or a weak base and its salt. Acidic buffers, for example, can be prepared using potassium chloride or potassium hydrogen phthalate with hydrochloric acid of appropriate concentrations. Neutral buffers can be prepared by mixing potassium dihydrogen phosphate and sodium hydroxide, for example. Alkaline (basic) buffers can be prepared by mixing borax or disodium hydrogen phosphate with sodium hydroxide, for example. Many more chemical combinations are possible, using appropriate chemicals to establish the proper sequence of proton transfer steps coupled with the intended reactions. Buffer exchange rates may be modified by combinations of buffer materials that react at different ionic exchange rates; buffers of low-change type react more rapidly than high-change types.

Aqueous polymers are preferred carriers for buffers in liquid form and includes water-reducible alkyds and modified alkyds, acrylic latexes, acrylic epoxy hybrids, water reducible epoxies, polyurethane dispersions, vinyls and ethylene vinyl acetates, and mixtures thereof. Such polymers are water vapor permeable but are repellent of liquid water and are essentially water insoluble after curing. These polymers can form a semipermeable membrane for water vapor and ionic transfer. Hence, if the surface of the metal substrate is dry, water vapor can permeate the membrane; but, buffering ions, which are present in the membrane or that pass through the membrane, can passivate the metal surface thereby reducing corrosion.

Buffer materials are chosen based on the type of the surface or substrate to be protected. Metal substrates may be protected from corrosion by passivating the substrate surface. Such passivation may generally be accomplished only in certain pH ranges which, in turn, depend on the specific substrate to be protected. For example, iron based alloys are passivated with an alkaline pH (pH 8–12). This pH range is preferably accomplished with sodium silicate and/or potassium silicate powders; but other alkaline materials may be used. A blend of sodium and potassium silicates is also useful for achieving viscosity control in aqueous carrier/membrane formulations.

In a further aspect of the invention, a mineralized layer is obtained by mixing silicates and anodic oxidizing materials such as sodium carbonate and delivering the mixture in a manner effective to activate the metal surface.

While the above description emphasizes a zinc containing surface, the surface of a wide range of metal surfaces can be altered to impart beneficial surface characteristics. In most cases, the substrate or the surface thereof contributes cations to the mineralization-forming reaction. Examples of metal surfaces include zinc, iron, copper, brass, iron, steel, stainless steel, lead, alloys thereof, among others. In the case of limited mineral layer formation or thickness of the mineral layer is caused by the surface contribution of the cation, an improved result can be obtained by managing or tailoring the pH. That is, the buffering capacity and the pH of the carrier is substrate surface-specific and is tailored to manage the surface chemistry to form the inventive mineralization layer, e.g., selecting a pH at which the surface is reactive encourages formation of the mineralization layer. The reaction for forming the new surface with continue until such time that the finite quantity of metal atoms at the surface are consumed. If the new mineralized layer is marred or destroyed, a desirable aspect of the instant invention is that the surface will reinitiate mineralization formation with any available precursors. The ability to reinitiate mineralization or self-repair damaged surfaces is a novel and particularly desirable characteristic of the invention.

The delivery/method of the alkali metal polyoxolates (or mineralization layer) can be provided through a membrane from a reservoir as described in the U.S. patent application Ser. No. 08/634,215; previously incorporated by reference. In the present invention, soluble precursors, such as silicate materials, are used within one or more coating layers. For example, in a polymer containing carrier system, one of the layers would be charged with sodium or potassium silicates wherein the outer layer(s) are employed to control the rate of moisture flow through the carrier. These carriers are typically relatively hard films as the normal polymerization of the carrier occurs to form a plastic type polymer type coating. Additional delivery methods have been developed utilizing soft films, gels, sealants, adhesives, and paints wherein the membrane feature is formed in-situ by the reaction between a silicate, e.g., sodium silicate, and silica. By controlling the quantity of the silica in the carrier, the mineralized layer can be designed to suit the specific application. Depending upon the pH and relative concentration of silicate and silica, the degree of crystal formation, e.g., a silica containing hemimorphite within an amorphous layer, can also be designed to achieve a predetermined result.

Without wishing to be bound by any theory or explanation the formation of the mineralized layer can occur under a wide range of conditions (normally ambient) and via a plurality of mechanisms. Normally, the mineralization layer forms underneath the carrier upon the metal surface, e.g., as buried layer under a carrier comprising a reservoir of precursors. If so formed, whatever ions are needed in the reservoir layer to form the mineralized layer, are expediently included as water soluble salts in the reservoir layer. On the other hand, all the ions employed to form the mineralized layer need not necessarily be included in the reservoir layer. That is, if desired cations can be supplied from the underlying metal surface and need not necessarily be included as water soluble salts in the reservoir layer. Such cations can be obtained from the surface of the substrate metal itself, by reaction of the substrate with the anions of the precursor component for the mineralized layer. Since the mineralized layer is normally relatively thin, sufficient cations for the mineralized layer can even be supplied from the substrate when present only as an alloying ingredient, or perhaps even as an impurity. Additionally, the cations needed for the mineralized layer can be supplied from water soluble salts in the reservoir layer, as indicated above. Further, if the mineralized layer is to be formed from an overlying reservoir layer that also contains buffer components, at least some to the salts used for buffering can be employed for forming the mineralized layer. The latter reservoir layer would possess a self healing effect by functioning as a source of minerization precursors in the event the layer was damaged. Once the mineralization layer has been formed to the degree desired, the carrier or reservoir layer can remain as a component of the finished article or removed.

Applications for the films and coatings of the invention include, for example, components such as coatings and paints of components, parts and panels for use the automotive industry, home-consumer products, construction and infrastructures, aerospace industry, and other out-door or corrosive applications wherein it is desirable to improve the characteristics of a metal surface and the use of heavy metals in elemental or non-elemental form is environmentally undesirable. The films and coatings may be applied to new products or over conventional platings to extend the useful service life of the plated component.

While the above description places particular emphasis upon forming a silicate containing mineralized layer, one or more mineralized layers having chemically similar or distinct compositions can be applied upon the same metal surface. If desired, the mineralized surface can be further modified by using conventional physical or chemical treatment methods.

The following Examples are provided to illustrate not limit the scope of the invention as defined in the appended claims. These Examples contain results of the following analysis: Auger Electron Spectroscopy (AES), Electronic Impedance Spectroscopy (EIS), and X-ray Photoelectron Spectroscopy (XPS). These analysis were performed using conventional testing procedures. The results of the AES demonstrate that the thickness of the mineralized layer can range from about 10 to 50 microns. EIS demonstrates that the mineralized layer imparts corrosion resistant properties to the surface, e.g., a reduced Icorr corresponds to a reduced corrosion current and in turn a reduced corrosion rate. The XPS data demonstrates the presence of a unique hemimorphite crystal within the mineralized layer, e.g., XPS measures the bond energy between silicon and oxygen atoms and compares the measured energy to standardized values in order to determine whether or not known crystals are present. Conventional X-ray diffraction analysis confirmed that the mineralized layer is predominately amorphous, e.g., an X-ray measurement resulted in wide bands thereby indicating the presence of an amorphous phase.

EXAMPLES

Auger Electron Spectroscopy

Examples 1–4 were prepared and analyzed in accordance with the following AES procedure.
Instrumentation Used
  Instrument: Physical Electronics 545, Single Pass Cylindrical Analyzer
  Sample Excitation:
    Electron Gun
    Emission Current, 1 mA
    Beam Voltage, 3 kV
  Electron Beam Detection: Multiplier Voltage, 1 kV
    Modulation Voltage, 3 eV
  Signal Detection: Lock-in Magnification, 10X
    Lock-in Time Constant, 0.001 sec.
  Sputter Gun Settings: Beam Voltage, 3 kV
    Focus Dial Setting, 2
    Raster X Dial Setting, 10
    Raster Y Dial Setting, 10

Emission Current, 15, mA
  Sputter Rate, 12 Å/min
  Start Time, 0 min.
  Final Time, 30 min
  Sputter Depth, 360 Å

Example 1

The coating had a first layer with the following formulation (by weight):
  25% Water (Fisher Scientific)
  75% NeoRezR-9637 (Zeneca Resins)
and a second layer with the following formulation (by weight):
  6.5% N-grade Sodium Silicate
  13% Water (Fisher Scientific)
  80.5% NeoRezR-9637 (Zeneca Resins)
The components were mixed by hand for approximately 15 minutes. The first layer was then cast onto a standard 1010 steel test panel, obtained through ACT Laboratories, with a dry film thickness of about 0.5 to 0.7 mil. This layer was dried to tack free at 60 C for 10 minutes. The second layer was then applied, with a dry film thickness of about 0.5 to 0.7 mil. This layer was also dried to tack free at 60 C for 10 minutes. The second layer was left on the panel for a minimum of 24 hours. Most of the coating was then removed with BIX. Stripper (Walmart Stores) and a plastic spatula. The residual coating was washed off with copious amounts of Naptha (Commercial Grade, Walmart Stores), and Reagent Alcohol (Fisher Scientific).

Example 2

The coating had one layer with the following formulation (by weight):
  25% Water (Fisher Scientific)
  75% NeoRezR-9637 (Zeneca Resins)
and a second layer with the following formulation (by weight)
  6.5% N-grade Sodium Silicate
  13% Water (Fisher Scientific)
  80.5% NeoRezR-9637 (Zeneca Resins)
The components were mixed by hand for approximately 15 minutes. The first layer was then cast onto a standard electrogalvanized test panel, obtained through ACT Laboratories, with a dry film thickness of about 0.5 to 0.7 mil. This layer was dried to tack free at 60 C. for 10 minutes. The second layer was then applied, with a dry film thickness of about 0.5 to 0.7 mil. This layer was also dried to tack free at 60 C. for 10 minutes. The coating was left on the panel for a minimum of 24 hours. Most of the coating was then removed with BIX Stripper (Walmart Stores) and a plastic spatula. The residual coating was washed off with copious amounts of Naptha (Commercial Grade, Walmart Stores), and Reagent Alcohol (Fisher Scientific).

Example 3

The coating had one layer with the following formulation (by weight):
  25% Water (Fisher Scientific)
  75% NeoRezR-9637 (Zeneca Resins)
and a second layer with the following formulation (by weight)
  6.5% N-grade Sodium Silicate
  13% Water (Fisher Scientific)
  80.5% NeoRezR-9637 (Zeneca Resins)

The components were mixed by hand for approximately 15 minutes. The first layer was then cast onto a standard zinc phosphated, 1010 steel test panel, obtained through ACT Laboratories, with a dry film thickness of about 0.5 to 0.7 mil. This layer was dried to tack free at 60 C. for 10 minutes. The second layer was then applied, with a dry film thickness of about 0.5 to 0.7 mil. This layer was also dried to tack free at 60 C. for 10 minutes. The coating was left on the panel for a minimum of 24 hours. Most of the coating was then removed with BIX Stripper (Walmart Stores) and a plastic spatula. The residual was washed off with copious amounts of Naptha (Commercial Grade, Walmart Stores), and Reagent Alcohol (Fisher Scientific).

Example 4

The coating had one layer with the following formulation (by weight):

25% Water (Fisher Scientific)

75% NeoRezR-9637 (Zeneca Resins)

and a second layer with the following formulation (by weight)

6.5% N-grade Sodium Silicate

13% Water (Fisher Scientific)

80.5% NeoRezR-9637 (Zeneca Resins)

The components were mixed by hand for approximately 15 minutes. The first layer was then cast onto a standard iron phosphated, 1010 steel test panel, obtained through ACT Laboratories, with a dry film thickness of about 0.5 to 0.7 mil. This layer was dried to tack free at 60 C. for 10 minutes. The second layer was then applied, with a dry film thickness of about 0.5 to 0.7 mil. This layer was also dried to tack free at 60 C. for 10 minutes. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Each of the previously described washed test panels were passed through an AES analysis in accordance with conventional methods. This analysis confirmed the presence of the inventive mineral layer and generated data which demonstrated that for each substrate, the thickness of the mineralized layer was on the order of about 50 to about 70 Å thick.

Electrical Impedance Spectroscopy

Examples 5 through 13 were prepared for Electrochemical Impedance Spectroscopy (EIS) analysis. EIS is one method of determining corrosion rates of a metal or a coated metal. In this technique, a small-amplitude sinusoidal potential perturbation was applied to the working electrode at a number of discrete frequencies ranging from 60,000 Hz to 0.0005 Hz. At each one of these frequencies, the resulting current waveform exhibited a sinusoidal response that was out of phase with the applied potential signal by a certain amount. The electrochemical impedance was a frequency-dependent proportionality factor that acts as a transfer function by establishing a relationship between the excitation voltage signal and the current response of the system. This method was detailed by the American Society for Testing and Materials (ASTM) in Electrochemical Corrosion Testing, STP 727.

Example 5

A gel was prepared having the following formulation (by weight):

10% Cab-O-Sil TS-720 Silica

90% Amoco DURASYN™ 174 polyalphaolefin

The above formulation was mixed in a Hobart Mixer (model N-50) for approximately 30 minutes. The gel was then cast onto a standard electrogalvanized test panel, obtained through ACT Laboratories, at a thickness of $1/16$" to $1/8$". The gel was left on the panel for a minimum of 24 hours. Most of the gel was then removed with a plastic spatula. The residual gel was washed off with copius amounts of Naptha (Commercial Grade, Walmart Stores), and Reagent Alcohol (Fisher Scientific).

Example 6

A gel was prepared having the following formulation (by weight):

10% Cab-O-Sil TS-720 Silica

20% G-Grade Sodium Silicate (PQ Corporation)

70% Amoco DURASYN™ 174 polyalphaolefin

The above formulation was mixed in a Hobart Mixer (model N-50) for approximately 30 minutes. The gel was then cast onto a standard electrogalvanized test panel, obtained through ACT Laboratories, at a thickness of $1/16$" to $1/8$". The gel was left on the panel for a minimum of 24 hours. Most of the gel was then removed with a plastic spatula. The residual was washed off with copius amounts of Naptha (Commercial Grade, Walmart Stores), and Reagent Alcohol (Fisher Scientific).

Example 7

A gel was prepared having the following formulation (by weight):

10% Cab-O-Sil TS-720 Silica

20% Sodium Molybdate (Fisher Scientific)

70% Amoco DURASYN™ 174 polyalphaolefin

The above formulation was mixed in a Hobart Mixer (model N-50) for approximately 30 minutes. The gel was then cast onto a standard electrogalvanized test panel, obtained through ACT Laboratories, at a thickness of $1/16$" to $1/8$". The gel was left on the panel for a minimum of 24 hours. Most of the gel was then removed with a plastic spatula. The residual was washed off with copius amounts of Naptha (Commercial Grade, Walmart Stores), and Reagent Alcohol (Fisher Scientific).

Example 8

A gel was prepared having the following formulation (by weight):

10% Cab-O-Sil TS-720 Silica

20% Sodium Phosphate (Fisher Scientific)

70% Amoco DURASYN™ 174 polyalphaolefin

The above formulation was mixed in a Hobart Mixer (model N-50) for approximately 30 minutes. The gel was then cast onto a standard electrogalvanized test panel, obtained through ACT Laboratories, at a thickness of $1/16$" to $1/8$". The gel was left on the panel for a minimum of 24 hours. Most of the gel was then removed with a plastic spatula. The residual was washed off with copius amounts of Naptha (Commercial Grade, Walmart Stores), and Reagent Alcohol (Fisher Scientific).

This Example was repeated with the exception that sodium carbonate was employed instead of sodium phosphate.

Example 9

A coating was prepared having the following formulation (by weight):
  25% Water (Fisher Scientific)
  75% NeoRezR-9637 (Zeneca Resins)

The above formulation was mixed by hand for approximately 15 minutes. The coating was then cast onto a standard 1010 steel test panel, obtained through ACT Laboratories, at a thickness for a total dry film thickness of 2.1 to 2.5 mils in three layers. Each layer was dried to tack free at 60 C. for 15 minutes. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Example 10

A coating was prepared having the following formulation (by weight):
  6.5% N-grade Sodium Silicate
  13% Water (Fisher Scientific)
  80.5% NeoRezR-9637 (Zeneca Resins)

The above formulation was mixed by hand for approximately 15 minutes. The coating was then cast onto a standard 1010 steel test panel, obtained through ACT Laboratories, at a thickness for a total dry film thickness of 2.1 to 2.5 mils in three layers. Each layer was dried to tack free at 60 C. for 15 minutes. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Example 11

A coating was prepared having the following formulation (by weight):
  6.5% Sodium Vanadate Solution (156.3 grams/liter)
  13% Water (Fisher Scientific)
  80.5% NeoRezR-9637 (Zeneca Resins)

The above formulation was mixed by hand for approximately 15 minutes. The coating was then cast onto a standard 1010 steel test panel, obtained through ACT Laboratories, at a thickness for a total dry film thickness of 2.1 to 2.5 mils in three layers. Each layer was dried to tack free at 60 C. for 15 minutes. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Example 12

A coating was prepared having the following formulation (by weight):
  6.5% Sodium Molybdate Solution (274.21 grams/liter)
  13% Water (Fisher Scientific)
  80.5% NeoRezR-9637 (Zeneca Resins)

The above formulation was mixed by hand for approximately 15 minutes. The coating was then cast onto a standard 1010 steel test panel, obtained through ACT Laboratories, at a thickness for a total dry film thickness of 2.1 to 2.5 mils in three layers. Each coat was dried to tack free at 60 C. for 15 minutes. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Example 13

A coating was prepared having the following formulation (by weight):
  6.5% Sodium Carbonate Solution (120.12 grams/liter)
  13% Water (Fisher Scientific)
  80.5% NeoRezR-9637 (Zeneca Resins)

The above formulation was mixed by hand for approximately 15 minutes. The coating was then cast onto a standard 1010 steel test panel, obtained through ACT Laboratories, at a thickness for a total dry film thickness of 2.1 to 2.5 mils in three layers. Each layer was dried to tack free at 60 C. for 15 minutes. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

The cleaned samples from Examples 5 to 13 were then tested by EIS in accordance with the following method.

Instrument: Solartron 1287 Electrochemical Interface
  Solartron 1260 Impedance/Gain-Phase Analyzer
  ZW are and CorrWarr Software by Scribner Settings: 60,000 to 0.005 Hz.
  10 steps/decade
  5 mV rms AC. signal Test Solution: 1 Molar Ammonium Sulfate, pH=3.0 (using 0.1N Sulfuric Acid) for electrogalvanized substrates.

1 Molar Ammonium Sulfate, pH=2.0 (using 0.1N Sulfuric Acid) for 1010 Steel substrates.

B value: corresponds to the average of the Tafel slope B=(BcBa)/(Bc+Ba)

icorr: corresponds to the current generated by corrosion

The following Table sets forth the results of the EIS Procedure for the zinc substrate in Examples 5–8.

EIS TABLE FOR ZINC SUBSTRATES

| surface | B (mV) | $i_{corr}$ $\mu A/cm^2$ | ave. B | ave. $i_{corr}$ $\mu A/cm^2$ | EXPL NO. | Comments |
|---|---|---|---|---|---|---|
| Bare Zinc | 0.062632 | 193.3 | 0.067255 | 205.5 | standard | |
| | 0.060229 | 204.4 | | | std | |
| | 0.063586 | 226.3 | | | std | |
| | 0.101038 | 85.3 | | | std | 1 |
| | 0.071548 | 213.1 | | | std | |
| | 0.0792307 | 243.6 | | | std | 11 |
| | 0.078282 | 190.2 | | | std | |
| Gel | 0.054997 | 120.4 | 0.055658 | 130.1 | 5 | |
| | 0.045513 | 148.5 | | | 5 | |
| | 0.035642 | 64.8 | | | 5 | |
| | 0.041034 | 79.7 | | | 5 | |
| | 0.039146 | 72.5 | | | 5 | |
| | 0.060190 | 113.1 | | | 5 | |
| | 0.061932 | 138.5 | | | 5 | |
| $Na_2SiO_4$ | 0.072070 | 110.7 | 0.047529 | 97.5 | 6 | |
| | 0.059899 | 121.5 | | | 6 | |
| | 0.035932 | 93.2 | | | 6 | |
| | 0.038235 | 107.7 | | | 6 | |

EIS TABLE FOR ZINC SUBSTRATES

| surface | B (mV) | $i_{corr}$ ($\mu A/cm^2$) | ave. B | ave. $i_{corr}$ ($\mu A/cm^2$) | EXPL NO. | Comments |
|---|---|---|---|---|---|---|
| | 0.040076 | 67.3 | | | 6 | |
| | 0.038964 | 84.7 | | | 6 | |
| $Na_2MoO_4$ | 0.052667 | 99.3 | 0.061923 | 128.5 | 7 | |
| | 0.072482 | 191.1 | | | 7 | |
| | 0.059900 | 98.5 | | | 7 | |
| | 0.065942 | 128.6 | | | 7 | |
| | 0.058622 | 125.0 | | | 7 | |
| | 0.090991 | 153.9 | | | 7 | 2 |
| $Na_2PO_4$ | 0.047173 | 93.3 | 0.049479 | 153.9 | 8 | |
| | 0.045828 | 141.0 | | | 8 | |
| | 0.053326 | 232.8 | | | 8 | |
| | 0.056754 | 178.1 | | | 8 | |
| | 0.058574 | 194.0 | | | 8 | |
| | 0.035220 | 84.2 | | | 8 | |
| $Na_2CO_3$ | 0.041397 | 68.4 | 0.047339 | 98.7 | 8 | |
| | 0.044320 | 121.8 | | | 8 | 2 |
| | 0.046295 | 81.1 | | | 8 | |
| | 0.057343 | 123.4 | | | 8 | 3 |

[1] Cell leaked at the base, setting up a localized galvanic cell.
[1] Cell leaked underneath gasket.
[2] Cell leaked at the base, discarded this data point.

The results of the EIS indicates that the greatest corrosion resistance (low icorr) for a zinc substrate is obtained by a sodium silicate or sodium silicate or sodium carbonate mineral layers.

The following Tables list the corrosion data for the steel surfaces of Examples 9–13.

| surface | Hours Immersed | B (mV) | $R_p$ (ohm-$cm^2$) | $i_{corr}$ ($\mu A/cm^2$) |
|---|---|---|---|---|
| Coating Without Silicates-Example 9 | | | | |
| steel | 24 | 39.4 | 68 | 580 |
| — | 49 | 33.8 | 55 | 614 |
| — | 74 | 33.8 | 116 | 290, pH = 2.86 |
| — | 99 | 33.8 | 25 | 1352, pH = 2.0 |
| — | 21 | 34.4 | 54 | 637 |
| — | 44 | 36.3 | 95.8 | 379 |
| — | 68 | 45 | 55.6 | 808, pH = 2.36 |
| — | 1 | 46.1 | 59.3 | 777 |
| — | 24 | 41.7 | 43.8 | 952 |
| — | 48 | 43.3 | 55.5 | 780, pH = 2.4 |
| — | 1 | 42 | 135 | 311 |
| — | 24.5 | 40.8 | 51.8 | 788 |
| — | 48 | 40.5 | 53 | 764, pH = 2.5 |
| Coating Containing Sodium Silicate-Example 10 | | | | |
| steel | 24 | 30.3 | 47.5 | 640 |
| — | 49 | 35.3 | 55 | 642 |
| — | 74 | 35.3 | 267 | 132, pH = 3.15 |
| — | 99 | 35.3 | 20 | 1765, pH = 2 |
| — | 1.5 | 43.4 | 74.4 | 584 |
| — | 21 | 35.5 | 94.2 | 377 |
| — | 44 | 31.5 | 125 | 252 |
| — | 68 | 33.8 | 172 | 196, pH = 2.25 |
| steel - coating was not completely stripped | 1 | 36.7 | 564 | 65 |
| steel | 26 | 33.2 | 371 | 90 |
| — | 57 | 33.2 | 554 | 60 |
| steel - coating was restripped | 1 | 42.4 | 32.6 | 1300 |
| steel | 1 | 42.2 | 59.7 | 707 |
| — | 24 | 40.8 | 58.7 | 695 |
| — | 48 | 40.8 | 70.2 | 581, pH = 2 |
| Coating Containing Sodium Vandate-Example 11 | | | | |
| steel | 25 | 305.8 | 55.5 | 645 |

| surface | Hours Immersed | B (mV) | $R_p$ (ohm-$cm^2$) | $i_{corr}$ ($\mu A/cm^2$) |
|---|---|---|---|---|
| — | 49 | 33.9 | 75.8 | 448 |
| — | 74 | 33.9 | 82.6 | 410, pH = 2.8 |
| — | 78 | 42.2 | 25.7 | 1640, pH = 2 |
| — | 1.5 | 50.5 | 70 | 721 |
| — | 21 | 36.5 | 92 | 397 |
| — | 44 | 33.3 | 126 | 265 |
| — | 68 | 33.2 | 161 | 206, pH = 2.25 |
| — | 1 | 40.8 | 146 | 280 |
| — | 24 | 40.6 | 64.6 | 632 |
| — | 48 | 40.6 | 75.6 | 537, pH = 2 |
| — | 1 | 42.6 | 62.9 | 677 |
| — | 24 | 34.6 | 65 | 536 |
| — | 48 | 39.1 | 110 | 355, pH = 2.1 |
| Coating Containing Sodium Molybdate-Example 12 | | | | |
| steel | 21 | 37.4 | 51.3 | 729 |
| — | 44 | 44.4 | 45.6 | 973 |
| — | 68 | 41.4 | 54.3 | 763, pH = 2.35 |
| steel - coating was not completely removed | 1 | 37.7 | 190 | 198 |
| steel | 26 | 36.6 | 138 | 265 |
| — | 57 | 36.6 | 212 | 173 |
| steel - coating was not completely removed) | 1 | 33.3 | 112 | 353 |
| — | 24 | 40.4 | 96.6 | 409 |
| — | 48 | 39.5 | 130 | 293, pH = 2.2 |
| — | 1 | 46.9 | 42.5 | 1109 |
| — | 24 | 48.2 | 28.6 | 1687 |
| — | 44 | 46 | 45.2 | 1018, pH = 2.15 |
| Coating Containing Sodium Carbonate-Example 13 | | | | |
| steel | 25 | 37.2 | 82.5 | 451 |
| — | 49 | 27.6 | 123.5 | 223 |
| — | 74 | 27.6 | 128.8 | 214, pH = 2.3 |
| — | 78 | 37.2 | 34.4 | 1080, pH = 2 |
| — | 1 | 41.8 | 56.8 | 735 |
| — | 24.5 | 44.2 | 33.5 | 1320 |
| — | 48 | 43.4 | 40.7 | 1066, pH = 2.9 |
| — | 1 | 39.5 | 112 | 353 |
| — | 24 | 40.6 | 96.6 | 409 |
| — | 48 | 38.1 | 130 | 293, pH = 2.2 |
| — | 1 | 45.7 | 46.7 | 978 |
| — | 24 | 46.5 | 29.7 | 1566 |
| — | 44 | 44.4 | 41.4 | 1072, pH = 2.15 |

Based upon the measured corrosion currents, sodium carbonate and sodium silicate are Based upon the measured corrosion currents, sodium carbonate and sodium silicate are the most effective in reducing the icorr thereby indicating a reduced corrosion rate.

X-Ray Photoelectron Spectroscopy (XPS)

X-ray Photoelectron Spectroscopy (XPS) was performed on a series of samples in Examples 14–24 that included 1010 Steel and Electrogalvanized Steel. XPS was performed in accordance with conventional procedures in this art.

Instrumentation Used
  Instrument: Physical Electronics 5701 LSci
  X-ray Source: Monochromatic aluminum
  Source Power: 350 watts
  Analysis Region: 2 mm×0.8 mm
  Exit angle: 65°
  Acceptance angle: ±7°
  Charge reference: B.E. of C-)H,C)=284.6 eV
  Charge neutralization: flood gun
  Sampling Depth: (3λ) was 70 Å

Example 14

A coating was prepared having the following formulation (by weight):
25% Water (Fisher Scientific)
75% NeoRezR-9637 (Zeneca Resins)

The above formulation was mixed by hand for approximately 15 minutes. The coating was then cast onto a standard electrogalvanized test panel, obtained through ACT Laboratories, for a total dry film thickness of 2.1 to 2.5 mils in three layers. Each layer was dried to tack free at 60 C. for 15 minutes. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Example 15

A coating was prepared having the following formulation (by weight):
25% Water (Fisher Scientific)
75% NeoRezR-9637 (Zeneca Resins)

The above formulation was mixed by hand for approximately 15 minutes. The coating was then cast onto a standard electrogalvanized test panel, obtained through ACT Laboratories, for a total dry film thickness of 2.1 to 2.5 mils in three layers. Each layer was dried to tack free at 60 C. for 15 minutes. The coated panel was then exposed to a post-cure heat treatment of 1 hour at 125° C., using a standard laboratory oven. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Example 16

A coating was prepared having the following formulation (by weight):
6.5% N-grade Sodium Silicate
13% Water (Fisher Scientific)
80.5% NeoRezR-9637 (Zeneca Resins)

The above formulation was mixed by hand for approximately 15 minutes. The coating was then cast onto a standard electrogalvanized test panel, obtained through ACT Laboratories, for a total dry film thickness of 2.1 to 2.5 mils in three layers. Each layer was dried to tack free at 60 C. for 15 minutes. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Example 17

A coating was prepared having the following formulation (by weight):
6.5% N-grade Sodium Silicate
13% Water (Fisher Scientific)
80.5% NeoRezR-9637 (Zeneca Resins)

The above formulation was mixed by hand for approximately 15 minutes. The coating was then cast onto a standard electrogalvanized test panel, obtained through ACT Laboratories, for a total dry film thickness of 2.1 to 2.5 mils in three layers. Each layer was dried to tack free at 60 C. for 15 minutes. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Example 18

A coating was prepared having the following formulation (by weight):
6.5% N-grade Sodium Silicate
13% Water (Fisher Scientific)
80.5% NeoRezR-9637 (Zeneca Resins)

The above formulation was mixed by hand for approximately 15 minutes. The coating was then cast onto a standard electrogalvanized test panel, obtained through ACT Laboratories, for a total dry film thickness of 2.1 to 2.5 mils in three layers. Each layer was dried to tack free at 60 C. for 15 minutes. The coated panel was then exposed to a post-cure heat treatment of 125° C. for one hour, in a standard laboratory oven. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Example 19

A coating was prepared having the following formulation (by weight):
6.5% N-grade Sodium Silicate
13% Water (Fisher Scientific)
80.5% NeoRezR-9637 (Zeneca Resins)

The above formulation was mixed by hand for approximately 15 minutes. The coating was then cast onto a standard electrogalvanized test panel, obtained through ACT Laboratories, for a total dry film thickness of 2.1 to 2.5 mils in three layers. Each layer was dried to tack free at 60 C. for 15 minutes. The coated panel was then exposed to a post-cure heat treatment of 175° C. for one hour, in a standard laboratory oven. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Example 20

For purposes of comparing the results achieved by Examples 14–19, an electrogalvanized panel was soaked for 24 hours in a solution that had the following formulation (by weight):
25 mg/l Sodium Silicate The sample panel was allowed to air dry.

Example 21

For purposes of comparing the results achieved by Examples 14–19, an electrogalvanized panel was soaked for 24 hours in a solution that had the following formulation (by weight):
25 mg/l Sodium Silicate The sample panel was allowed to air dry. The panel was then exposed to a post-dry heat treatment of 125° C. for one hour, in a standard laboratory oven.

Example 22

For purposes of comparing the results achieved by Examples 14–19, an electrogalvanized panel was soaked for 24 hours in a solution that had the following formulation (by weight):

25 mo/l Sodium Silicate

The sample panel was allowed to air dry. The panel was then exposed to a post-dry heat treatment of 175° C. for one hour, in a standard laboratory oven.

Example 23

A crystal sample of $Zn_2SiO_4$, which was air fractured and immediately introduced into the sample chamber of the XPS. The total air exposure was less than 2 minutes. The surface was examined initially with a low resolution survey scan to determine which elements were present. High resolution XPS spectra were taken to determine the binding energy of the elements detected in the survey scan. The quantification of the elements was accomplished by using the atomic sensitivity factors for a Physical Electronics 5701 LSci ESCA spectrometer.

The following Table sets forth the silicon binding energies which were measured for Examples 14–23.

| Example Number | Treatment | Si 2p peak Energy (eV) |
|---|---|---|
| 14 | Room Temp | 101.9 |
| 15 | 125° C. | 101.8 |
| 16 | Room Temp | 102.8 |
| 17 | Room Temp | 102.8 |
| 18 | 125° C. | 102.6 |
| 19 | 175° C. | 102.6 |
| 20 | 25 ppm $Na_2SiO_4$, 25° C. | 101.7 |
| 21 | 25 ppm $Na_2SiO_4$, 125° C. | 101.7 |
| 22 | 25 ppm $Na_2SiO_4$, 175° C. | 101.8 |
| 23 | $Zn_2SiO_4$ crystal | 101.5 |

The above Table illustrates that there has been a change in the concentration of Si as well as the bond energy thereby providing further confirmation of the presence of the mineralized layer. Further, the Si—O bond energy of conventional zinc silicate crystal as well as the silicate soaked panels is distinct from the inventive mineralized layer.

Example 24

A coating was prepared having the following formulation (by weight):

6.5% N-grade Sodium Silicate
13% Water (Fisher Scientific)
80.5% NeoRezR-9637 (Zeneca Resins)

The formulation above was mixed by hand for approximately 15 minutes. The coating was then cast onto a standard electrogalvanized test panel, obtained through ACT Laboratories, for a total dry film thickness of 2.1 to 2.5 mils in three coats. Each coat was dried to tack free at 60 C. for 15 minutes. The panel was exposed to ASTM B 117 Salt Fog Chamber for 2400 hours. At the end of the salt fog exposure, there were large areas of the panel that were uncorroded. The area of uncorroded surface was cut into a small square sample and the urethane coating was removed by hand, using small tweezers. The sample was analyzed in accordance with the previously identified XPS method on an instrument of comparable sensitivity and accuracy. The results of the XPS are set forth in the following Table.

EXAMPLE 24

Silicate Containing Coating Followed by Salt Spray Exposure

| Example Number | Treatment | Si 2p peak Energy (eV) | Relative Concentration of Silicon on the Surface (% wt) |
|---|---|---|---|
| 14 | urethane coating, room temp | 101.9 | negligible at 1.0% |
| 15 | urethane coating, 125° C. | 101.8 | negligible at 0.8% |
| 16 | silicate, room temp | 102.8 | 19.8% |
| 17 | silicate 125° C. | 102.8 | 18.9% |
| 18 | silicate, room temp | 102.6 | 15.8% |
| 19 | silicate, 175° C. (heat applied after coating removed) | 102.6 | 11.6% |
| 20 | immersion, 25 ppm $Na_2SiO_4$, 25° C. | 101.7 | 4.1% |
| 21 | immersion, 25 ppm $Na_2SiO_4$, 125° C. | 101.7 | 3.2% |
| 22 | immersion, 25 ppm $Na_2SiO_4$, 175° C. | 101.8 | 3.9% |
| 23 | $Zn_2SiO_4$ crystal | 101.5 | NA |
| 24 | silicate, room temp, 2400 hours of B117 exposure | 102.6 | 8.1% |

The above Table illustrates that the binding energy for the surface exposed to the silicate containing coatings range from 102.6 to 102.8. By observation of the XPS peak, it was observed that these energy values were actually manifold values from manifold peaks that contain more than one material. These materials can be characterized as a disilicate, or hemimorphite (bonding energy at 102.2), altered by the presence of Si—O bonds, as in $SiO2$ (bonding energy at 103.3) and Si—O-C. bonds with a bonding energy of 103.6 or 103.7. Such a bonding energy and concentration of Si on the surface are distinct from conventional silica or silicate structures. The binding energy, for zinc silicate, $Zn_2SiO_4$, 101.5 eV, is also distinct from the binding energy of the mineralized layer, 102.7 eV, or the hemimorphite.

It is to be understood that the foregoing is illustrative only and that other means and techniques may be employed without departing from the spirit or scope of the invention as defined in the following claims.

The following is claimed:

1. A mineralized layer comprising an amorphous phase and an inorganic complex crystalline material comprising at least one ion selected from group consisting of Group I, II and III metals; an alkali metal, silicon and oxygen within the amorphous phase, made by a process comprising contacting a substrate with a mineral precursor wherein said precursor interacts with at least a portion of the substrate to form said layer and the precursor comprises at least one member selected from the group consisting of silicates, silica, sodium hydroxide molybdates, phosphates, zirconates, titanates, tungstates, vandates, permanganate, pertechnetate, chromate, nitrate, carbonates, aluminates, and ferrates and wherein the precursor is dispersed within a carrier comprising at least one member selected from the group consisting of synthetic oil, naturally occurring oil or wax and polymeric resin material.

2. A mineralized layer comprising a reaction product formed in situ between a substrate and a precursor comprising at least one member selected from the group consisting of silicates, silica, sodium hydroxide, molybdates, phosphates, zirconates, titanates, tungstates, vandates, permanganate, pertechnetate, chromate, nitrate, carbonates, aluminates, and ferrates and wherein the precursor is dispersed within a carrier comprising at least one member selected from the group consisting of synthetic oil, naturally occurring oil or wax and polymeric resin material and wherein the reaction product comprises an amorphous phase and an inorganic complex crystalline material comprising at least one ion selected from the group of Group I, II and III metals; silicon, an alkali metal and oxygen within said phase and wherein the amount of oxygen present in said inorganic complex crystalline material is less than stoichometric.

3. A corrosion resistant mineralized layer formed in situ between a substrate and a precursor comprising at least one silicate and optionally at least one member selected from the group consisting of molybdates, phosphates, zirconates, titanates, tungstates, vandates, permanganate, pertechnetate, chromate, nitrate, carbonates, aluminates, and ferrates and wherein the precursor is dispersed within a carrier comprising at least one member selected from the group consisting of synthetic oil, naturally occurring oil or wax an polymeric resin material and wherein the corrosion resistant mineralized layer comprises an amorphous phase and an inorganic complex crystalline material.

4. The mineralized layer of claim 1 2, or 3 wherein the substrate comprise at least one member selected from the group consisting of iron, steel, zinc, magnesium, aluminum, vanadium, calcium, beryllium, manganese, cobalt, nickel, copper, zirconium, thallium, and chromium.

5. The mineralized layer of claim 1 or 2 wherein the electrical impedance spectroscopy value of the layer is less than about 121 $\mu$A/cm2.

6. The mineralized layer of claim 1 or 2 wherein the electrical impedance spectroscopy value of the layer is less than about 205 $\mu$A/cm2.

7. The mineralized layer of claim 1 or 2 wherein the Si—O bonding energy is less than about 102.8 eV.

8. The mineralized layer of claim 1 or 2 wherein the alkali metal comprises at least one of sodium and potassium.

9. The mineralized layer of claim 1 or 2 wherein the substrate comprises iron or an iron alloy.

10. The mineralized layer of claim 1, 2 or 3 wherein the substrate comprises zinc.

11. The mineralized layer of claim 1, or 2 wherein the bonding energy for Si—O in the layer as measured by XPS is greater than that measured for $Zn_2SiO4$.

12. The mineralized layer of claim 1, or 2 wherein the thickness of the layer is less than 100 Angtroms.

13. The corrosion resistant mineral layer of claim 3 wherein the carrier comprises at least one member selected from the group consisting of polyalpholefins, polyurethanes, epoxies and acrylics.

14. The corrosion resistant mineral layer of claim 3 wherein the precursor comprises about 1 to about 60 wt. % of the carrier.

* * * * *